(12) United States Patent
Qian et al.

(10) Patent No.: US 8,228,982 B2
(45) Date of Patent: Jul. 24, 2012

(54) ADAPTIVE VIDEO STREAMING SYSTEM AND METHOD

(75) Inventors: Zhebin Qian, ShangHai (CN); Yu Zhang, ShangHai (CN); Ping Liu, Simpsonville, SC (US); Li Xu, ShangHai (CN)

(73) Assignee: UTC Fire & Security Corporation, Farmington, CT (US)

( * ) Notice: Subject to any disclaimer, the term of this patent is extended or adjusted under 35 U.S.C. 154(b) by 422 days.

(21) Appl. No.: 12/564,303

(22) Filed: Sep. 22, 2009

(65) Prior Publication Data

US 2010/0074324 A1 Mar. 25, 2010

(30) Foreign Application Priority Data

Sep. 23, 2008 (CN) .......................... 2008 1 0165775

(51) Int. Cl.
*H04N 11/02* (2006.01)
(52) U.S. Cl. .......... 375/240.02; 375/240.12; 375/240.16
(58) Field of Classification Search ................ 375/240.16–240.21, 240, 240.02, 375/240.12
See application file for complete search history.

(56) References Cited

U.S. PATENT DOCUMENTS

| | | | |
|---|---|---|---|
| 6,580,754 B1 * | 6/2003 | Wan et al. ................. | 375/240.01 |
| 6,795,863 B1 | 9/2004 | Doty, Jr. | |
| 7,143,432 B1 | 11/2006 | Brooks et al. | |
| 7,299,292 B2 | 11/2007 | Morten et al. | |
| 7,327,761 B2 | 2/2008 | Rajwan et al. | |
| 2006/0222078 A1 * | 10/2006 | Raveendran ............. | 375/240.16 |
| 2007/0036354 A1 * | 2/2007 | Wee et al. ........................ | 380/37 |
| 2007/0064794 A1 * | 3/2007 | Wang et al. ............... | 375/240.03 |
| 2008/0130736 A1 * | 6/2008 | Onno et al. ............... | 375/240.01 |
| 2008/0130757 A1 * | 6/2008 | Trandel et al. ........... | 375/240.25 |
| 2008/0131014 A1 * | 6/2008 | Lee et al. ....................... | 382/251 |
| 2008/0137755 A1 * | 6/2008 | Onur et al. ............... | 375/240.26 |
| 2008/0260042 A1 * | 10/2008 | Shah et al. ............... | 375/240.25 |
| 2009/0016434 A1 * | 1/2009 | Amonou et al. .......... | 375/240.12 |

OTHER PUBLICATIONS

Congestion-Aware Rate Allocation for Multipath Video Streamingover Ad Hoc Wireless NetworksXiaoqing Zhu, Sangeun Han and Bernd GirodInformation Systems Laboratory, Department of Electrical EngineeringStanford University••zhuxq,sehan,bgirod_ ©Stanford.EDUhttp://www.stanford.edu/~zhuxq/publication/icip2004_rate.pdf.
An Integrated Software Architecture for Bandwidth Adaptive Video StreamingProceedings of World Academy of Science, Engineering and Technology vol. 27 Feb. 2008 ISSN 1307-6884http://www.waset.org/pwaset/v27/v27-13.pdf.
Improving last-hop multicast streaming video over 802.11Igor Kozintsev, Jeff McVeighIntel Corporation http://www.broadnets.org/2004/workshop-papers/Broadwim/broadwim2004-05-kozintsev-invite.pdf.

* cited by examiner

*Primary Examiner* — Andrew Lai
*Assistant Examiner* — Nguyen Ngo
(74) *Attorney, Agent, or Firm* — MH2 Technology Law Group, LLP (57) ABSTRACT

A method of transmitting a video stream over an IP network. The method includes encoding a source video into a plurality of packets. The method also includes measuring a real-time transmission status of a current set of the plurality of packets. The method also includes mapping a utility curve for the video which reflects utilities of the video at corresponding sending rates. The method also includes calculating a target sending rate for a next set of the plurality of packets according to the real-time transmission status of the current set of the plurality of packets and the utility curve. The method also includes determining a proper strategy to meet the target sending rate for the next set of the plurality of packets.

20 Claims, 6 Drawing Sheets

| Frame Index I: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Layer 1: | 1, | 0, | 0, | 0, | 0, | 0, | 0, | 0, | 0, | 0, | 0, | 0, | 0, | 0, | 0, | 0 |
| Layer 2: | 1, | 0, | 0, | 0, | 0, | 0, | 0, | 0, | 1, | 0, | 0, | 0, | 0, | 0, | 0, | 0 |
| Layer 3: | 1, | 0, | 0, | 0, | 1, | 0, | 0, | 0, | 1, | 0, | 0, | 0, | 0, | 0, | 0, | 0 |
| Layer 4: | 1, | 0, | 0, | 0, | 1, | 0, | 0, | 0, | 1, | 0, | 0, | 0, | 1, | 0, | 0, | 0 |
| Layer 5: | 1, | 0, | 1, | 0, | 1, | 0, | 0, | 0, | 1, | 0, | 0, | 0, | 1, | 0, | 0, | 0 |
| Layer 6: | 1, | 0, | 1, | 0, | 1, | 0, | 1, | 0, | 1, | 0, | 0, | 0, | 1, | 0, | 0, | 0 |
| Layer 7: | 1, | 0, | 1, | 0, | 1, | 0, | 1, | 0, | 1, | 0, | 1, | 0, | 1, | 0, | 0, | 0 |
| Layer 8: | 1, | 0, | 1, | 0, | 1, | 0, | 1, | 0, | 1, | 0, | 1, | 0, | 1, | 0, | 1, | 0 |
| Layer 9: | 1, | 1, | 1, | 0, | 1, | 0, | 1, | 0, | 1, | 0, | 1, | 0, | 1, | 0, | 1, | 0 |
| Layer 10: | 1, | 1, | 1, | 1, | 1, | 0, | 1, | 0, | 1, | 0, | 1, | 0, | 1, | 0, | 1, | 0 |
| Layer 11: | 1, | 1, | 1, | 1, | 1, | 1, | 1, | 0, | 1, | 0, | 1, | 0, | 1, | 0, | 1, | 0 |
| Layer 12: | 1, | 1, | 1, | 1, | 1, | 1, | 1, | 1, | 1, | 0, | 1, | 0, | 1, | 0, | 1, | 0 |
| Layer 13: | 1, | 1, | 1, | 1, | 1, | 1, | 1, | 1, | 1, | 1, | 1, | 0, | 1, | 0, | 1, | 0 |
| Layer 14: | 1, | 1, | 1, | 1, | 1, | 1, | 1, | 1, | 1, | 1, | 1, | 1, | 1, | 0, | 1, | 0 |
| Layer 15: | 1, | 1, | 1, | 1, | 1, | 1, | 1, | 1, | 1, | 1, | 1, | 1, | 1, | 1, | 1, | 0 |
| Layer 16: | 1, | 1, | 1, | 1, | 1, | 1, | 1, | 1, | 1, | 1, | 1, | 1, | 1, | 1, | 1, | 1 |

ADAPTIVE VIDEO STREAMING SYSTEM AND METHOD

CROSS REFERENCE TO RELATED APPLICATIONS

This application claims priority under 35 U.S.C. §119(a)-(d) or (f) to prior-filed, co-pending Chinese Patent Application, Serial No. 200810165775.9, filed on Sep. 23, 2008, which is incorporated by reference herein in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention includes embodiments that relate to media transmission systems and methods, and more particularly to a system and method for adaptively controlling bit rates of media streams transmitted across an IP network.

2. Discussion of Related Art

Media streaming is used to transmit media from senders to receivers through an IP network. The IP network may include Internet, Intranet, or a local area network. The media refers to video, audio, or other multimedia data. For video streaming applications, as an example, it is desirable to stream videos over the IP network in a reliable and cost effective manner. However video streaming, particularly live video streaming, usually demands certain amount of bandwidth, it imposes challenges to resource restricted network. When the network is congested and no adequate bandwidth is reserved for video streaming, the packets will be inevitably dropped during transmission, thus make it difficult or impossible for the video receiver to reconstruct video due to packet losses.

For example, in a video surveillance system, devices, such as IP cameras, are installed to capture video of different scenes. The video stream data is encoded, and then transmitted across IP network to a video decoder. Each video stream consumes certain amount of bandwidth of the IP network. Since video streams may need to be route through network bottlenecks, where limited bandwidth is shared between dynamic traffic flows available bandwidth for video streaming can not always be guaranteed, which poses challenges to guarantee the quality of the video received by the receiver. Therefore, it is desirable to have a system and a method to dynamically adjust video streaming rate according to the available bandwidth. In this way, network congestion is relieved by sending less video data, video quality is improved due to less packet drops. Meanwhile, once the congestion is relieved and more bandwidth is available, we increase the streaming rate to take advantage of it. The collaborative, adaptive video streaming framework enables more intelligent use of the IP network bandwidth and delivers better video quality to the end users.

BRIEF SUMMARY OF THE INVENTION

In one embodiment, a method of transmitting a video stream over an IP network is provided. The method includes encoding a source video into a plurality of packets; measuring a real-time transmission status of a current set of the plurality of packets; mapping a utility curve for the video which reflects utilities of the video at corresponding sending rates; calculating a target sending rate for a next set of the plurality of packets according to the real-time transmission status of the current set of the plurality of packets and the utility curve; and determining a proper strategy to meet the target sending rate for the next set of the plurality of packets.

In one embodiment, a control system is provided. The control system includes an encoder configured to encode a video stream with selectable layers for extraction; a link-sensing module configured to measure a real-time transmission status for a current set of packets of the video stream; a rate allocation module configured to get the real-time transmission status information from the link-sensing module, the rate allocation module defining a utility curve which reflects utilities of the video stream at corresponding selectable layers, the rate allocation module being configured to determine a target sending rate for a next set of packets according to the real-time transmission status of the current set of packets and the utility curve; and a stream optimization module configured to determine a control strategy to meet the target sending rate for the next set of packets.

BRIEF DESCRIPTION OF THE SEVERAL VIEWS OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An embodiment of the invention relates to a method of transmitting a video stream. The method includes encoding a source video into a plurality of packets, measuring a real-time transmission status of a current set of the plurality of packets, and mapping a utility curve for the video which reflects users satisfaction of the video at corresponding sending rates. The method further includes calculating a target sending rate for a next set of the plurality of packets according to the real-time transmission status of the current set of the plurality of packets and the utility curve. The "media" can be video, audio, or multimedia data that is delivered through the IP network. The IP network can be Internet, Intranet, or a local area network.

Figure 1:
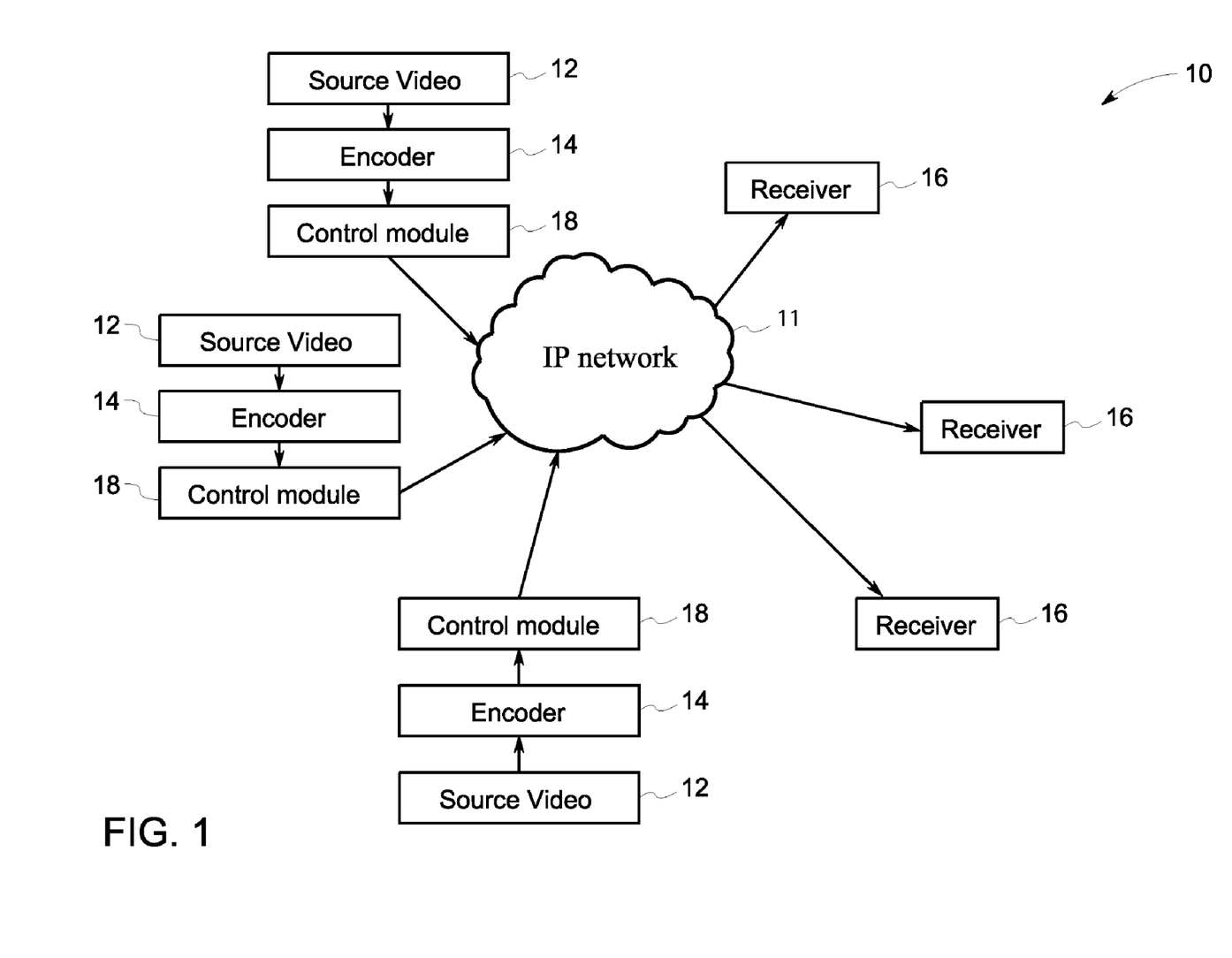
FIG. 1 illustrates a video streaming system for transmission of a number of video streams through an IP network according to an embodiment of the invention.

FIG. 1 illustrates a media streaming system 10 for transmitting media through an IP network 11 according to an embodiment of the invention. The media streaming system 10 is used for security or monitoring purposes, the media is video, and the IP network 11 is a local area network. Several IP cameras (not shown) capture videos of different scenes. The captured videos are shown as source videos 12, and are delivered to the encoders 14 for encoding. Encoded videos are transmitted through the IP network 11 and then are received by corresponding receivers 16, respectively. Each transmission line from a source video 12 to a corresponding receiver 16 is a "video stream". The system 10 has the same number of source videos 12 and receivers 16, and the source videos 12 and the receivers 16 are in a one-to-one corresponding relationship. In other embodiments, several receivers 16 access the same source video 12 through the IP network 11 and form several video streams, or one receiver 16 accesses several source videos 12 through the IP network 11 to form several video streams. Each stream further includes a real-time control module 18. Each control module 18 controls the real-time transmission rate of the corresponding video stream.

Figure 2:
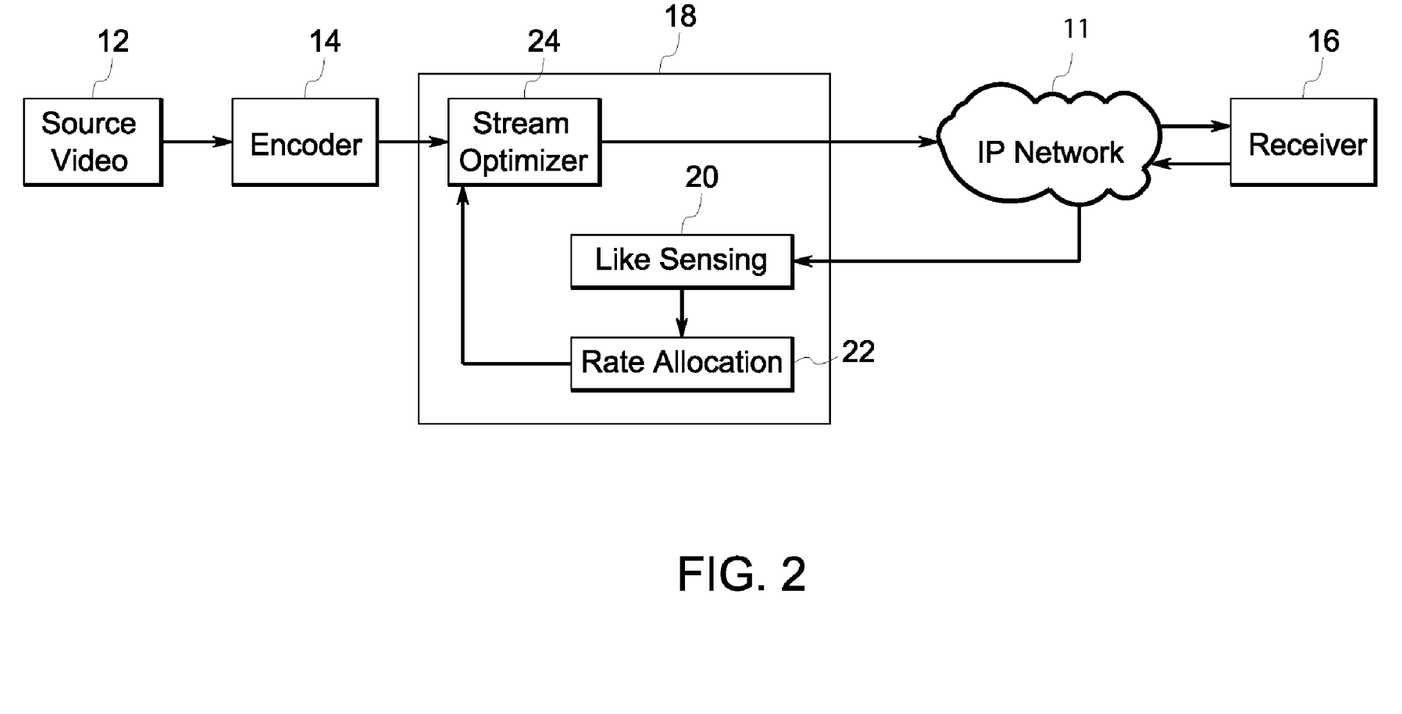
FIG. 2 is a block diagram for illustrating an exemplary video stream of FIG. 1.

FIG. 2 shows an exemplary video stream of FIG. 1. The source video 12 is delivered to the encoder 14. The encoder 14 encodes the source video 12 at a group of pictures (GOP) basis. Each GOP includes fix number of frames. Each frame is then packetized into a number of packets; the packets are transmitted through the IP network 11 and then received by the corresponding receiver 16. The control module 18 gets transmission status for a current set of packets $P_i$, and then determines a targeted sending rate for a next set of packets $P_{i+1}$. In certain embodiments, each set of packets can be a GOP, can be a part of the same GOP, or can be a combination of two or more adjacent GOPs.

The control module 18 includes a link-sensing module 20, a rate allocation module 22, and a stream optimization module 24. The link-sensing module 20 receives a transmission status information for the current set of packets $P_i$, and sends the transmission status information to the rate allocation module 22. The rate allocation module 22 determines a targeted sending rate for the next set of packets $P_{i+1}$ based on the transmission status information of the current set of packets $P_i$, and sends the targeted sending rate $R_{i+1}$ to the stream optimization module 24. The stream optimization module 24 then determines a control strategy to realize the targeted sending rate for the next set of packets $P_{i+1}$.

In certain embodiments, the link-sensing module 24 can be a module located in an application layer, a transport layer, an IP layer or a network interface card device driver of the system 10. The transmission status information, measured by the link-sensing module 24, may include packet loss rate (PLR), packet round trip time (RTT), sending rate ($R_s$) and receiving rate ($R_r$), and the like. The transmission status information can be measured by leveraging existing modules, or can be a dedicated design. In certain embodiments, the packet RTT is measured, independent of time synchronization, by a feedback message from the receiver 16. Once the receiver 16 receives a current set of packets $P_i$, it sends back a feedback message to the link-sensing module 20. When the link-sensing module 20 gets the feedback message, it measures the elapsed time between the corresponding sending time and the receiving time. In alternate embodiment, in some operating system 10, there is a DCCP (datagram congestion control)/TFRC (TCP Friendly Rate Control) stack, which is at the transport layer for measuring RTT, packet loss rate, sending rate, and receiving rate, etc. In still another embodiment, Real-time Control Protocol (RTCP) content can be self-designed to contain the required status information.

In one exemplary embodiment, the sending rate $R_{si}$ detected by the receiver 16 is determined by equation 1:

$$R_{si} = \Sigma Size/(T_{sn} - T_{s0}) \qquad \text{equation 1}$$

Wherein $\Sigma Size$ is a total size of the current set of packets $P_i$, $T_{sn}$ is the time that the encoder 14 sends a last packet of current set of packets $P_i$, and $T_{s0}$ is the time that the encoder 14 sends the first packet of current of packets $P_i$. In one example, $T_{sn}$ and $T_{s0}$ are contained in a header of the current set of packets $P_i$ and read by the receiver 16.

A receiving rate $R_{ri}$ of the current set of packets $P_i$ is determined by equation 2:

$$R_{ri} = \Sigma Size/T_{rn} - T_{r0} \qquad \text{equation 2}$$

Wherein $\Sigma Size$ is a total size of current set of packets $P_i$ been successfully received, $T_{rn}$ is the time that the receiver 16 receives the last packet of the current sent of packets $P_i$, and $T_{r0}$ is the time that the receiver 16 receives the first packet of the current set of packets $P_i$.

Figure 3:
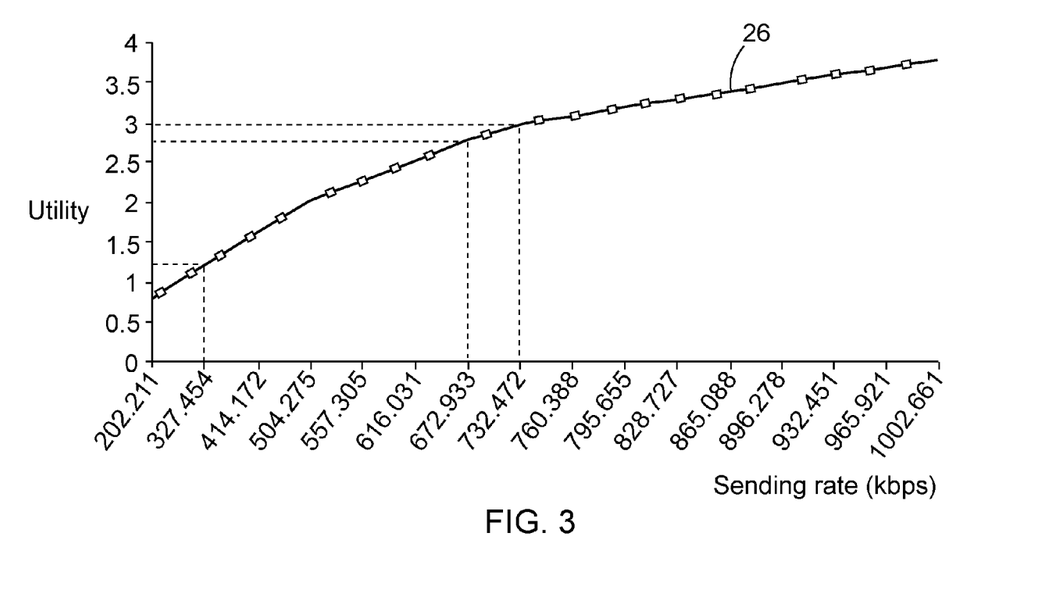
FIG. 3 illustrates a utility curve for the video stream of FIG. 2 according to one embodiment of the invention.

In certain embodiments, the rate allocation module 22 defines a utility curve for each video stream. The utility curve evaluates utility values at different sending rates $R_s$. An exemplary utility curve 26 is shown in FIG. 3. A horizontal coordinate of the utility curve 26 represents the sending rate $R_s$. A vertical coordinate represents the utilities of the corresponding sending rate $R_s$, which reflects a user satisfactory degree at the corresponding sending rate $R_s$. In one embodiment, the link-sensing module 20 measures a current sending rate $R_{si}$ for a current set of packets $P_i$. The rate allocation module 22 maps the sending rate $R_{si}$ to the utility curve 26, and then determines the target sending rate $R_{si+1}$ for the next set of packets $P_{i+1}$. Then the stream optimization module 24 determines a corresponding strategy for the next set of packets $P_{i+1}$.

Figure 4:
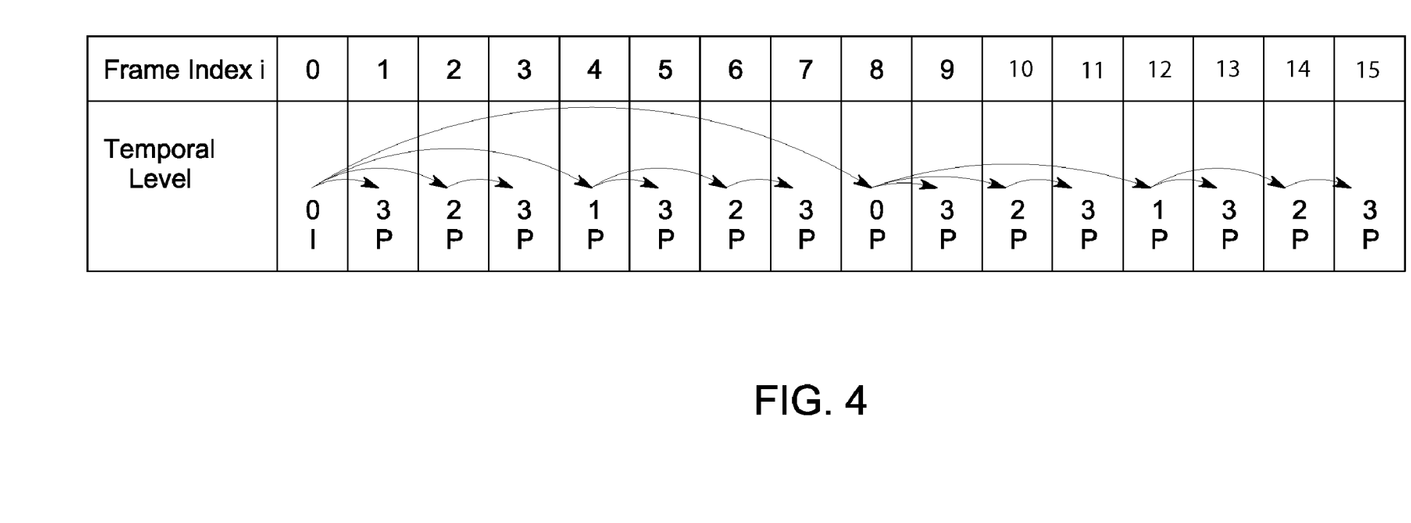
FIG. 4 schematically illustrates a scalable encoded Group of Pictures (GOP)

In an exemplary embodiment, the encoder 14 is scalable with selectable layers, and the utility curve 26 is defined based on the selectable layers. Such an encoder includes, for example, SVC (Scalable Video Coding), or MPEG-4 AVC/H.264 standard encoder. Referring to FIG. 4, the video stream is temporally encoded into a series of GOPs. Each GOP has 16 frames, each with a certain time sequence, and each frame has certain number of bytes. The GOP begins with an independently encoded I frame and includes one or more following P frames. Each I frame can be decoded without any information from any preceding or following frames. Decoding of a P frame requires information from a preceding frame in the GOP. In the exemplary embodiment of FIG. 4, frame number "0" is an I frame, and frame numbers "1-15" are P frames.

In certain embodiments, the frame arrangement of FIG. 4 provides 16 layers for extraction. An exemplary 16-layer extraction arrangement is shown as FIG. 5, which is defined by importance of the frames. At each layer, "1" represents the corresponding frame that will be sent, and "0" represents the corresponding frame that will not be sent. In the first layer, only frame number 0 is sent to the IP network 11, and a total frame size sent at this layer is the size of frame number 0. In the second layer, the frame "0" and "8" are sent to the IP network 11, and so on. The number 16 layer includes all sixteen frames, and the corresponding total frame size sent is a sum of sizes of all sixteen frames, which is the biggest total frame size. In this exemplary embodiment, the frame selection of layers is arranged in a manner to be substantially symmetric.

Figure 5:
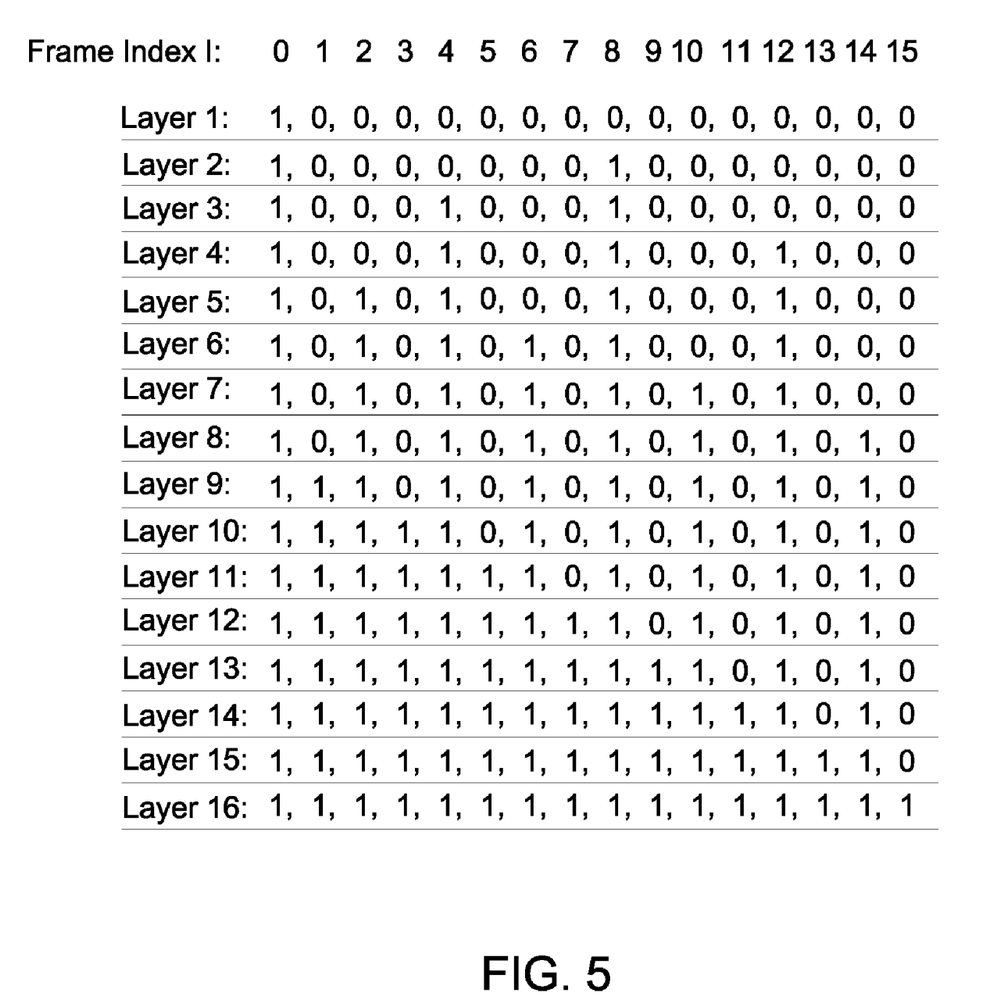
FIG. 5 illustrates selectable layers of the scalable encoded GOP of FIG. 4 according to an embodiment of the invention.

In certain embodiments, the horizontal correspondence of the utility curve 26 of FIG. 3 is defined by the sixteen layers of FIG. 5, and each layer is corresponded to a sending rate according to an accumulated frame size. Sixteen sending rates are obtained according to equation 3:

$$R_s = \Sigma Size / \Sigma T \qquad \text{equation 3}$$

Wherein ΣSize reflects a total size of the frames in the corresponding layer, and ΣT reflects the total time for the frames in this layer. A corresponding relationship of the layers with the sending rates for an exemplary GOP is shown in Table 1. The horizontal coordinate of the utility curve 26 is defined by the sixteen sending rates as illustrated in FIG. 3.

TABLE 1

| Frame index i | sending rate (Kbps) |
| --- | --- |
| 0 | 202.211 |
| 1 | 327.454 |
| 2 | 414.172 |
| 3 | 504.275 |
| 4 | 557.305 |
| 5 | 616.031 |
| 6 | 672.933 |
| 7 | 732.472 |
| 8 | 760.388 |
| 9 | 795.655 |
| 10 | 828.727 |
| 11 | 865.088 |
| 12 | 896.278 |
| 13 | 932.451 |
| 14 | 965.921 |
| 15 | 1002.661 |

The vertical correspondence of the utility curve 26 is defined by a utility of sending the corresponding layer of frames. In other words, the vertical correspondence of the utility curve reflects the corresponding evaluated transmission quality received by the receiver 16. The utilities are evaluated according to importance of the frames. For example, frame "0" is an I frame which is most important, and the utility is evaluated as 0.8, so that utility of layer 1 is 0.8. Frame "8" is a P frame, but directly depends from frame "0", then the utility of frame 8 is evaluated as 0.5, so that a total utility of layer 2 of FIG. 5, which includes frames "0" and "8" is a sum of utilities of frames "0" and "8", that is 1.3. Utilities of other layers can be evaluated in this way, then 16 points are defined, and a concave utility curve 26 is so defined based on the 16 points.

In certain embodiments, the rate allocation module 22 gets sending rate $R_{si}$ and receiver rate $R_{ri}$ from the link-sensing module 20, maps the sending rate $R_{si}$ to a nearest point $C_i$ of the utility curve 26, and determine the targeted bitrate $R_{si+1}$ for the next set of packets $P_{i+1}$ according to equations 4-6:

$$R_{si+1} = R_{si} + k*R_{si}(\text{utilityGain} - \text{Price}) \qquad \text{equation 4}$$

$$\text{Price} = (R_{si} - R_{ri})/R_{si} \qquad \text{equation 5}$$

$$\text{UtilityGain} = \lambda * \text{current\_gradient} / \text{max\_gradient} \qquad \text{equation 6}$$

Wherein "k" is a scaling parameter defined by user experience, which is, in one embodiment, between 0.1-3. Wherein "current_gradient" is the gradient of point $C_i$ of the utility curve 26, and "max_gradient" is the maximum gradient of the utility curve 26. "λ" is a parameter defined by user experience. "UtilityGain" expresses how much you are willing to pay to increase the sending rate at point $C_i$. Price expresses the current resource cost for the current allocation.

If the receiving rate $R_{ri}$ is equal to the sending rate $R_{si}$, the bandwidth resource to the current set of packets $P_i$ is assumed sufficient, and the value of "Price" is zero. The sending rate $R_{si+1}$ for the next set of packets $P_{i+1}$ can have an increase which is related to a ratio of the gradient of point $C_i$ with the maximum gradient of the utility curve 26.

If the receiving rate $R_{ri}$ is less than the sending rate $R_{si}$, the "Price" is larger than zero. It means that the network is experiencing congestion, and the transmission bitrate $R_{si+1}$ for the next set of packets $P_{si+1}$ needs to be decreased.

After a targeted bitrate $R_{si+1}$ for the next set of packets is calculated, the targeted bitrate $R_{si+1}$ is mapped to the corresponding utility curve 26. In certain embodiments, it selects a nearest bitrate R to $R_{si+1}$ in utility curve. The stream optimization module 24 then determines a proper control strategy to realize the bitrate R. In one embodiment, the stream optimization module 24 selects a corresponding layer of the scalable encoder 14. The source video 12 is temporally and/or spatially encoded, whereby, for the determined bitrate R, the steam optimization module 24 can select a corresponding temporal layer, or select a corresponding spatial layer, or select a corresponding Signal-to-Noise Ratio (SNR) layer, or select a combination of certain temporal, spatial, and SNR layers.

Figure 6:
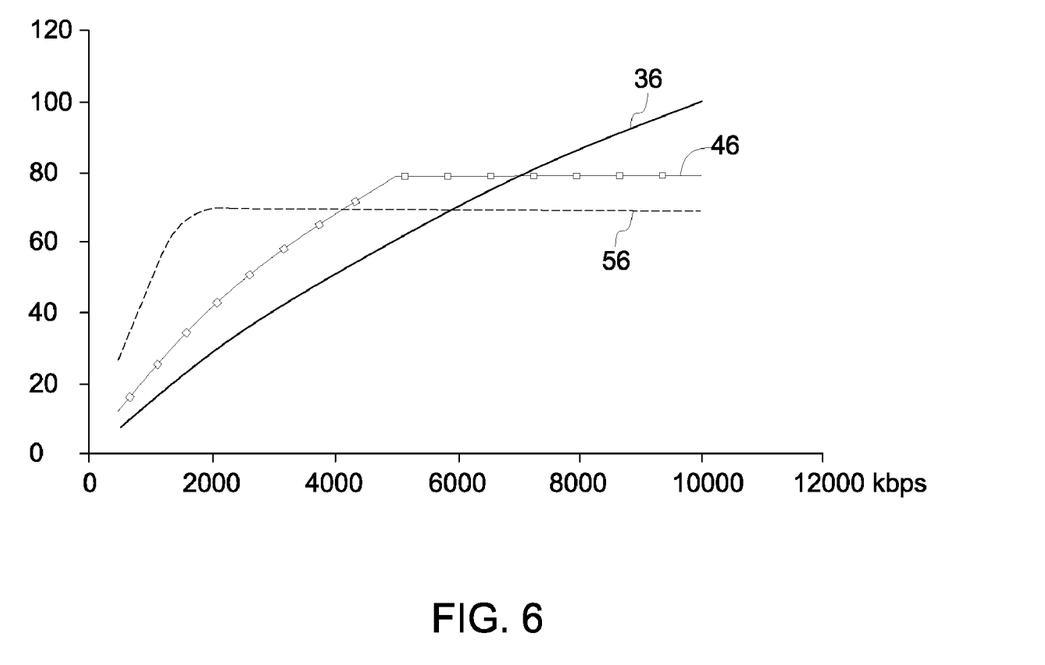
FIG. 6 illustrates utility curves of corresponding video streams in the video streaming system according to an embodiment of the invention.

In certain embodiments, different video streams in the streaming system 10 have different utility curves. FIG. 6 shows three exemplary utility curves 36, 46, 56 for three video streams, on which utility values of the three curves are defined by the same standard. The first video stream, with the utility curve 36, is defaulted with a 720*480 (D1) resolution and a frame rate of 30 frames per second (fps). The second video stream, with the utility curve 46, is defaulted with a D1 resolution and a frame rate of 15 fps. The third video stream, with the utility curve 56, is defaulted with a 352*240 (CIF) resolution and a frame rate of 15 fps. Each video stream has a corresponding controller 18 to real-time control the corresponding sending rate.

In certain embodiments, the controller 18 further includes an interface (not shown) for entering user requirements. A user can input a specific requirement on a specific resolution, a specific frame rate, or a specific SNR to the stream optimization module 24.

In alternate embodiments, the stream optimization module 24 sends the determined bitrate of the next set of packets to the encoder 14. The encoder 14 then compresses the source video 12 to meet the targeted bitrate.

It should be understood that the logic of the preferred embodiment(s) of the present invention could be implemented in hardware, software, firmware, or a combination thereof. In one preferred embodiment(s), the logic is implemented in software or firmware that is stored in a memory and that is executed by a suitable instruction execution system 10. If implemented in hardware, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), and etc. In addition, the scope of the present invention includes embodying the functionality of the preferred embodiments of the invention in logic embodied in hardware or software-configured mediums.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

What is claimed is:

1. A method of transmitting a video stream over an IP network, the method comprising:
    encoding a source video into a plurality of packets;
    measuring a real-time transmission status of a current set of the plurality of packets, wherein measuring the real-time transmission status includes measuring a sending rate and a receiving rate of the current set of the plurality of packets by a receiver;
    mapping a utility curve for the source video which reflects utilities of the source video at corresponding sending rates;
    calculating a target sending rate for a next set of the plurality of packets according to the, real-time transmission status of the current set of the plurality of packets and the utility curve; and
    determining a proper strategy to meet the target sending rate for the next set of the plurality of packets.

2. The method of claim 1, wherein encoding a source video includes encoding the source video with selectable layers.

3. The method of claim 2, wherein encoding the source video into selectable layers includes encoding the source video temporally into selectable temporal layers.

4. The method of claim 2, wherein encoding the source video into selectable layers includes encoding the source video spatially into selectable spatially layers.

5. The method of claim 2, wherein encoding the source video into selectable layers includes encoding the source video both temporally and spatially.

6. The method of claim 2, wherein encoding a source video into a plurality of packets includes encoding the source video into a series of groups of pictures, each group of pictures having a plurality of frames, and each group of pictures beginning with an independently encoded I frame and including one or more following P frames.

7. The method of claim 6, wherein mapping a utility curve for the video includes mapping the utilities at different selectable layers, the layers corresponding to a different sending rate.

8. The method of claim 6, wherein utilities of the utility curve at a corresponding layer is determined by importance of the frames at the corresponding layer.

9. The method of claim 2, wherein determining a proper strategy to get the target sending rate of the next set of the plurality of packets comprises selecting a corresponding layer according to the target sending rate.

10. The method of claim 1, wherein calculating a target sending rate for a next set of the plurality of packets according to the real-time transmission status of the current set of the plurality of packets and the utility curve includes mapping the sending rate of the current set of plurality of packets measured by the receiver to a nearest point on the utility curve and calculating the target sending rate according to a ratio of a gradient of the nearest point with a maximum gradient of the utility curve.

11. The method of claim 1, comprising:
    mapping a utility curve for each video stream in an IP network.

12. The method of claim 11, comprising:
    calculating a target sending rate of a next set of packet for each video stream independently.

13. A control system, comprising:
    an encoder configured to encode a video stream with selectable layers for extraction;
    a link-sensing module configured to measure a real-time transmission status for a current set of packets of the video stream;
    a rate allocation module configured to get the real-time transmission status information from the link-sensing module, the rate allocation module defining a utility curve which reflects utilities of the video stream at corresponding selectable layers, the rate allocation module being configured to determine a target sending rate for a next set of packets according to the real-time transmission status of the current set of packets and the utility curve; and
    a stream optimization module configured to determine a control strategy to meet the target sending rate for the next set of packets.

14. The control system according to claim 13, wherein the encoder is configured to encode the video stream temporally.

15. The control system according to claim 13, wherein the encoder is configured to encode the video spatially.

16. The control system according to claim 13 comprising:
    at least two rate allocation modules, each rate allocation module defining a utility curve for a corresponding video stream.

17. The control system according to claim 13, wherein the link-sensing module comprise an application interface for inputting an application parameter.

18. A method of transmitting a video stream over an IP network, the method comprising:
    encoding a source video into a plurality of packets;
    measuring a real-time transmission status of a current set of the plurality of packets, wherein measuring the real-time transmission status includes measuring a sending rate and a receiving rate of the, current set of the, plurality of packets by a receiver;
    mapping a utility curve for the source video which reflects utilities of the source video at corresponding sending rates;
    calculating a target sending rate for a next set of the plurality of packets according to the real-time transmission status of the current set of the plurality of packets and the utility curve; and
    transmitting at the target sending rate for the next set of the plurality of packets.

19. The method of claim 18, further comprising:
    mapping a utility curve for each video stream in an IP network.

20. The method of claim 19, further comprising:
    calculating a target sending rate of a next set of packet for each video stream independently.

* * * * *